(12) United States Patent
Grieser

(10) Patent No.: US 7,077,062 B2
(45) Date of Patent: Jul. 18, 2006

(54) SLEEVE-LIKE PRINTING OR TRANSFER FORM AND DEVICE FOR CHAMFERING THE LONGITUDINAL ENDS OF A SLEEVE-LIKE PRINTING OR TRANSFER FORM

(75) Inventor: Alfons Grieser, Sielenbach (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 10/273,004

(22) Filed: Oct. 17, 2002

(65) Prior Publication Data

US 2003/0075062 A1    Apr. 24, 2003

(30) Foreign Application Priority Data

Oct. 20, 2001    (DE) ................ 101 51 816

(51) Int. Cl.
*B41F 7/02* (2006.01)
*B41F 13/10* (2006.01)

(52) U.S. Cl. ............... 101/217; 101/375; 101/382.1

(58) Field of Classification Search ........... 101/216, 101/217, 375, 376, 382.1, 383, 384, 395, 101/415.1
See application file for complete search history.

(56) References Cited

U.S. PATENT DOCUMENTS

| 2,587,606 | A | * | 3/1952 | Dungler ................. 101/248 |
| 4,501,927 | A | * | 2/1985 | Sievert ................... 174/93 |
| 4,812,219 | A | | 3/1989 | Sattrup et al. | |
| 5,351,615 | A | | 10/1994 | Kobler et al. .......... 101/217 |
| 5,379,693 | A | | 1/1995 | Hoffmann et al. ...... 101/375 |
| 5,427,477 | A | | 6/1995 | Weiss | |
| 5,577,443 | A | * | 11/1996 | Songer .................. 101/375 |
| 6,030,134 | A | * | 2/2000 | Stewart ................ 400/600.2 |
| 6,038,975 | A | * | 3/2000 | Hoffmann et al. ...... 101/375 |
| 6,463,648 | B1 | * | 10/2002 | Gottling et al. .......... 29/426.1 |
| 6,550,992 | B1 | * | 4/2003 | Simmons et al. ........ 400/424 |
| 6,615,722 | B1 | * | 9/2003 | Alberstadt et al. ........ 101/375 |
| 6,640,705 | B1 | * | 11/2003 | Stuhlmiller et al. ...... 101/217 |
| 6,779,449 | B1 | * | 8/2004 | Hoffmann et al. ........ 101/375 |

FOREIGN PATENT DOCUMENTS

| DE | 299 08 721 | 10/1999 |
| EP | 0 250 503 | 8/1990 |
| EP | 0 704 301 | 12/1998 |

\* cited by examiner

*Primary Examiner*—Ren Yan
(74) *Attorney, Agent, or Firm*—Cohen, Pontani, Lieberman & Pavane

(57) ABSTRACT

A support sleeve made of a metallic material, preferably of nickel, is provided at at least one longitudinal end with a chamfer running all around in the inner circumference. This prevents damage to a film-like coating or thin intermediate sleeve, which surrounds the cylinder core to which the sleeve is fitted. A device for chamfering and deburring the longitudinal ends of the sleeve include a supporting body having a cylindrical journal with a diameter only slightly smaller than the internal diameter of the sleeve to be machined, in order to accommodate a longitudinal end of the sleeve and to guide the cut. A cutting holder is machined on the supporting body by means of which holder a cutter can be brought up to the inner circumference of the longitudinal end of the sleeve to be machined, and the supporting body can be rotated relative to the sleeve to be machined and pushed onto the journal.

6 Claims, 2 Drawing Sheets

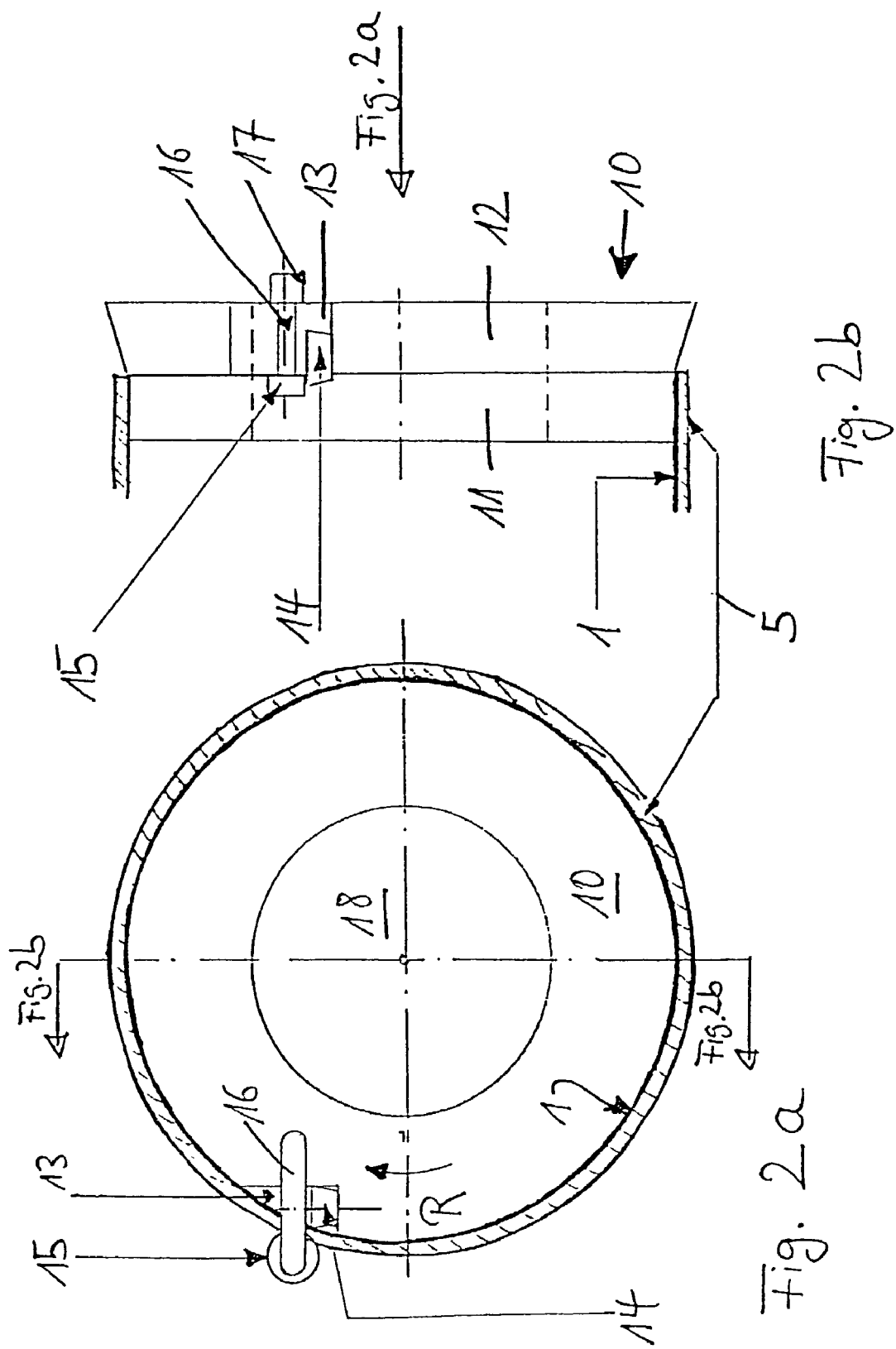

SLEEVE-LIKE PRINTING OR TRANSFER FORM AND DEVICE FOR CHAMFERING THE LONGITUDINAL ENDS OF A SLEEVE-LIKE PRINTING OR TRANSFER FORM

BACKGROUND OF THE INVENTION

1. Field of the Invention

The invention relates to the field of conventional printing on a rotary printing machine (for example offset, gravure, flexo or screen printing) and more particularly to a sleeve-like form for a printing or transfer cylinder including a support sleeve having an inner circumference and a pair of longitudinal ends.

The invention also relates to a device for chamfering the longitudinal ends of such a sleeve-like printing or transfer form.

2. Description of the Related Art

In the current sleeve technique for channel-less printing—in particular with rubber blanket and printing form, but also other printing processes—it is usual, in order to fit the sleeve-like printing or transfer form to a printing cylinder, to push the printing or transfer form onto the printing cylinder as it is widened by means of compressed air. The removal of the compressed air has the effect of placing the printing or transfer form on the printing cylinder with a form fit, on the principle of a shrink fit. By means of the renewed supply of compressed air, the printing or transfer form can be removed from the printing cylinder again.

Sleeves of this type, that is to say sleeve-like printing or transfer forms are generally built up from a support sleeve made of a metallic material, onto which the corresponding coating is applied. From flexographic printing, for example, it is sufficiently well known to apply sleeve-like printing and transfer coatings to nickel sleeves produced by electroplating.

U.S. Pat. No. 5,379,693 discloses a sleeve-like offset printing form or a form sleeve, which is produced from a metal plate cut rectangularly to size, by the edges of the plate pointing towards each other being connected by means of a welded seam. The support sleeve produced in this way is coated and exposed all around, except for the welded seam.

U.S. Pat. No. 5,351,615 discloses a sleeve-like offset rubber blanket or rubber sleeve, which is likewise produced from a tailor-made support plate, to which, in the planar state, a rubber layer is applied, by the start and end of the support plate together with the rubber layer being welded to each other.

When such a sleeve is being pushed onto a printing cylinder, in order to be able to adjust and mount the sleeve accurately and in a fixed position there, provision is generally still made, as indicated for example by EP 0 704 301 B1, of a thin intermediate layer in the form of a self-adhesive film, which is easily replaceable, between the surface of the cylinder core and the inner surface of the sleeve, or else a coating on the surface of the cylinder core, or else as a thin replaceable sleeve. This intermediate layer can also have a thermally insulating effect. The intermediate layer is also known as an Astralon film, with regard to its material.

The sleeve, whose internal diameter is smaller than that of the printing cylinder core, after being precentered, for example by means of a conical taper on the printing cylinder body, is widened mechanically to the larger printing cylinder diameter, so that the sleeve can be pushed completely onto the cylinder body over an air cushion.

Nevertheless, as the sleeve is being pushed onto the printing cylinder body, it may occur that the thin film placed on the latter is scratched by the metallic support sleeve of the sleeve or is damaged by pressure. In particular when the metallic support plate is being cut to size, no deburring of the cut edges has been carried out, and therefore the metallic support sleeve has sharp-edged burrs likewise running all around the internal diameter at its longitudinal ends. A thin Astralon film can likewise be damaged by such burrs.

SUMMARY OF THE INVENTION

It is therefore an object of the present invention to develop a sleeve-like printing or transfer form, in general terms a sleeve with a metallic support sleeve, in such a way that when it is being pushed onto a printing cylinder, damage to a film-like coating or thin intermediate sleeve, which surrounds the cylinder core, can be ruled out and, for this purpose, to provide a device with which such a development of a sleeve can be implemented.

According to the invention, this object is achieved by providing the sleeve with a chamfer around the inner circumference of at least of the one longitudinal ends, using an apparatus including a supporting body having a cylindrical journal with a diameter which is slightly smaller than the internal diameter of the sleeve. A cutter is mounted in a cutting holder in the supporting body so that the inner circumference can be deburred and chamfered as the longitudinal end is pushed onto the journal and the sleeve is rotated relative to the supporting body.

In each case, a preferred exemplary embodiment of a sleeve and device according to the invention will be described in the following text with reference to the drawing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2a shows a section through a device according to the invention for chamfering and deburring a sleeve, and FIG. 2b shows a section, rotated through 90° with respect to FIG. 2a, through the device according to the invention.

DETAILED DESCRIPTION OF THE PRESENTLY PREFERRED EMBODIMENTS

Figure 1A:
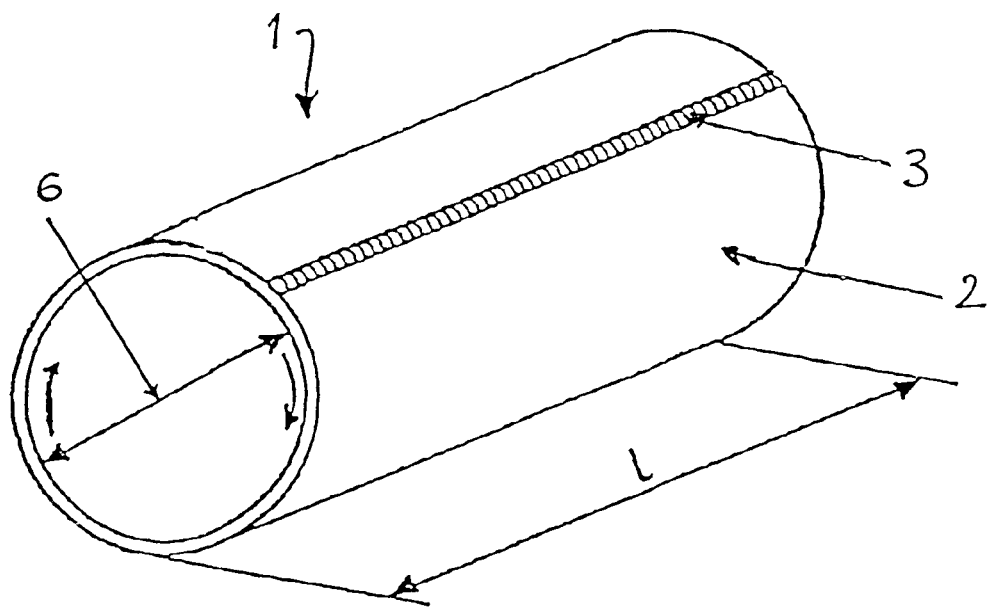
FIG. 1a shows a perspective view of a metallic support sleeve for a printing or transfer form.

FIG. 1a shows in highly schematic form an exemplary embodiment of a support sleeve 1 made of a metallic material, which may be nickel, aluminum, steel, stainless steel or brass, for example. In the present case, the initial form was a rectangular, thin-walled piece of plate, which has been brought into the desired hollow cylindrical shape 2 of length 1 by bending. The edges of the piece of plate facing each other are preferably firmly connected to each other by means of a welded seam 3. The arrows indicate that, at one longitudinal end, which is provided at the first in the direction in which it is pushed onto the printing cylinder core, a chamfer 4 running all around is provided in the inner circumference.

Figure 1B:
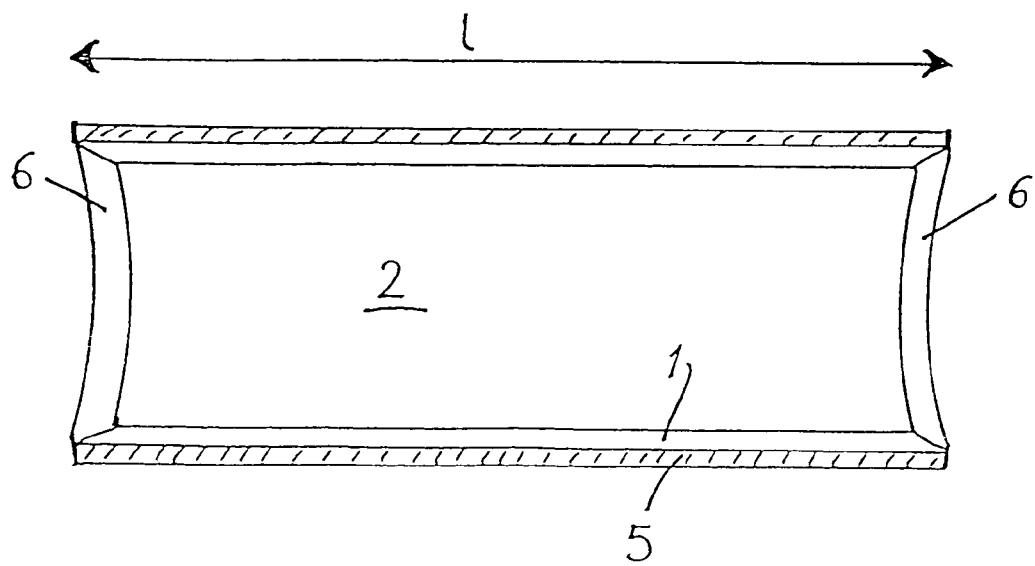
FIG. 1b shows a highly schematic longitudinal section through a rubber blanket sleeve (transfer form) according to the invention.

FIG. 1b shows the chamfer 4 for a rubber sleeve in detail. The metallic support sleeve 1, preferably made of nickel, is provided on its outer circumference and its length 1 with a rubber coating 5. The chamfer 4 and therefore at the same time any possible deburring of the end cut edges of the support sleeve 1 are preferably implemented by means of a chamfer 6 opening outwards in the manner of a cone at at least one longitudinal end of the support sleeve 1. The chamfer 6 runs all around on the inner circumference of the hollow cylindrical shape 2 of the support sleeve 1. A chamfer 6 is preferably provided on the front longitudinal end in the direction in which the sleeve is pushed on but, as illustrated, can be provided at both longitudinal ends of the support sleeve 1.

FIGS. 2a and 2b show a device according to the invention for chamfering and deburring the longitudinal ends of printing or transfer forms. A support sleeve 1 made of nickel together with rubber covering 5 is accommodated at the inner circumference of one longitudinal end by a cylindrical supporting body 10 belonging to the device according to the invention. The supporting body 10 comprises a journal 11 which runs coaxially and flat with respect to the sleeve to be accommodated, has a diameter which is only slightly smaller and serves to guide the cut, and a frusto-conical piece 12 which runs in the manner of a ramp and serves as a stop for the sleeve 1, 5 pushed onto the journal 11.

The supporting body 10 with bearing journal 11 and frusto-conical piece 12 is preferably turned in one piece from a plastic with good sliding properties.

On the outer circumference, in the radial direction, a recess 13 to hold a cutter holder 14 is machined into the frusto-conical piece 12. By means of this recess 13, a cutter can be brought up to the bearing journal 10 in such a way that the longitudinal end of the sleeve 1, 5 to be machined covers the cutter. The cutter holder 14 is constructed in the form of a turning cutting plate, which is firmly attached to a planar wall of the recess 13 which runs radially with respect to the cylindrical supporting body 10 and is aligned axially with respect to the sleeve. The turning cutting plate 14 can be fixed firmly, but can be tilted in a desired manner relative in terms of the distance to the inner circumference of the sleeve 1, 5 pushed onto the bearing journal 11 of the supporting body 10, in such a way that when the supporting body 10 is set rotating relative to the sleeve 1, 5 pushed on, the turning cutting plate 14 deburrs the support sleeve 1 at the pushed-on longitudinal end all around the inner circumference by removing material, or provides the support sleeve 1 with a chamfer 6 (FIG. 1b).

In a particularly preferred development, the supporting body 10 is equipped with a back-pressure roller 15, in such a way that the longitudinal end of the sleeve 1, 5 to be chamfered can be pushed onto the journal 11 to guide the cut between the turning cutting plate 14 and the back-pressure roller 15. For this purpose, on that side of the supporting body 10 which faces away from the sleeve 1, 5 to be machined, a pivoting lever 16 is fitted which, by means of a rigid lever arm, engages over the frusto-conical piece 12 and brings the back-pressure roller 15 rotatably mounted on the lever arm to bear on the outer circumference of the sleeve 1, 5 opposite the turning cutting plate 14 acting on the inner circumference of the support sleeve 1. The pivoting lever 16 is rigidly connected to the supporting body 10 by means of a screw 17 but, when the screw 17 is loosened, can of course be adjusted continuously relative to the outer circumference of the sleeve 1, 5 or is connected to the supporting body 10 such that it can move but can be fixed by springing.

The supporting body 10 can then be set rotating manually relative to the sleeve 1, 5 to be machined.

For this purpose, a bore 18 is provided coaxially with respect to the outer circumference of the supporting body 10. The sleeve 1, 5 can then be pushed onto the journal 11 for cut guidance, as far as the stop on the frusto-conical piece 12, with one longitudinal end between the turning cutting plate 14 and back pressure roller 15. The device can be held firmly on the frusto-conical piece 12 by one hand engaging in the bore 18, and the sleeve 1, 5 pushed on can be rotated on the journal 11 with the other hand in the direction of the arrow R, which depends on the position of the cutting holding plate 14 in the recess 13 in relation to the inner circumference of the longitudinal end of the sleeve 1, 5, or vice versa, so that during the rotation of the support sleeve 1 on the journal 11 of the device, the turning cutting plate 14 machines a chamfer 6 according to FIG. 1b on the inner circumference of the support sleeve 1 and, of course, at the same time deburrs the cut edge.

Of course, it is conceivable to carry out the rotation of the sleeve relative to the device for chamfering and deburring under drive from a motor. However, this is not specifically implemented here.

The invention is not limited by the embodiments described above which are presented as examples only but can be modified in various ways within the scope of protection defined by the appended patent claims.

I claim:

1. A sleeve-like form for mounting on one of a printing cylinder and a transfer cylinder, the one of a printing cylinder and a transfer cylinder including a cylinder core and one of a film coating or a thin intermediate sleeve surrounding the cylinder core for facilitating mounting of said form, said form comprising a support sleeve made of a rectangular metal sheet having opposite edges which are joined together at a welded seam, said support sleeve having an inner circumference, a pair of longitudinal ends, and a chamfer all round the inner circumference at at least one of said longitudinal ends, said support sleeve being designed to be expanded by compressed air as it is pushed over the one of a film coating or a thin intermediate sleeve surrounding the cylinder core, wherein edges of said chamfer are deburred and said chamfer is arranged and dimensioned such that damage to the one of a film coating or a thin intermediate sleeve by said chamfer and said edges of said chamfer when said support sleeve is pushed over the one of a film coating or a thin intermediate sleeve is prevented.

2. A sleeve-like form as in claim 1 wherein said support sleeve has a chamfer all around the inner circumference at both of said longitudinal ends.

3. A sleeve-like form as in claim 1 wherein said chamfer is a conical chamfer.

4. A sleeve-like form as in claim 1 wherein said support sleeve is made of nickel.

5. A sleeve-like form as in claim 1 further comprising a coating on said sleeve.

6. A sleeve-like form as in claim 1 wherein said chamfer is produced by turning with a cutting tool.

* * * * *